Feb. 28, 1950      F. L. WINCHESTER      2,498,780
SHOCK ABSORBING TRAILER MOUNT

Filed Aug. 18, 1947      3 Sheets-Sheet 1

INVENTOR.
Franklin L. Winchester
BY
ATTORNEY

Feb. 28, 1950 — F. L. WINCHESTER — 2,498,780
SHOCK ABSORBING TRAILER MOUNT
Filed Aug. 18, 1947 — 3 Sheets-Sheet 2
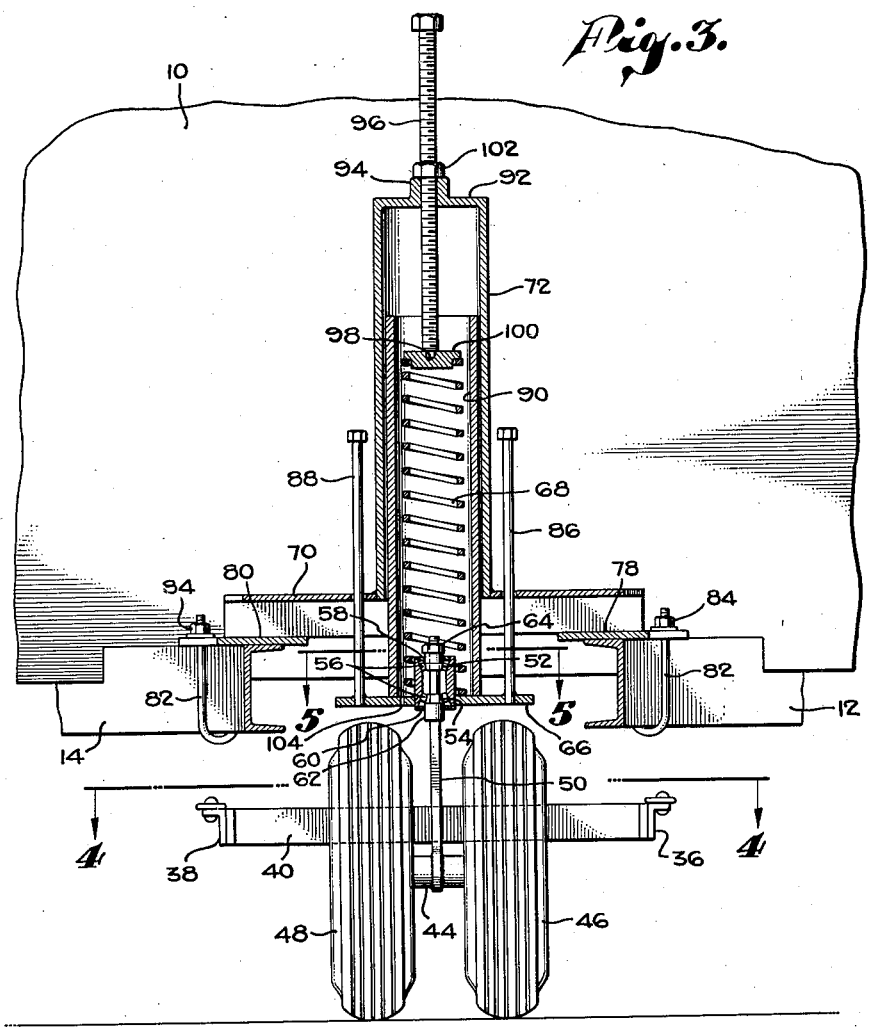
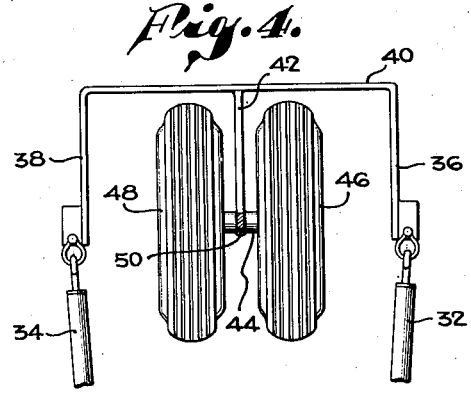
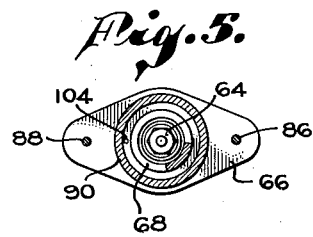
INVENTOR.
Franklin L. Winchester
BY
ATTORNEY Feb. 28, 1950 F. L. WINCHESTER 2,498,780
SHOCK ABSORBING TRAILER MOUNT
Filed Aug. 18, 1947 3 Sheets-Sheet 3
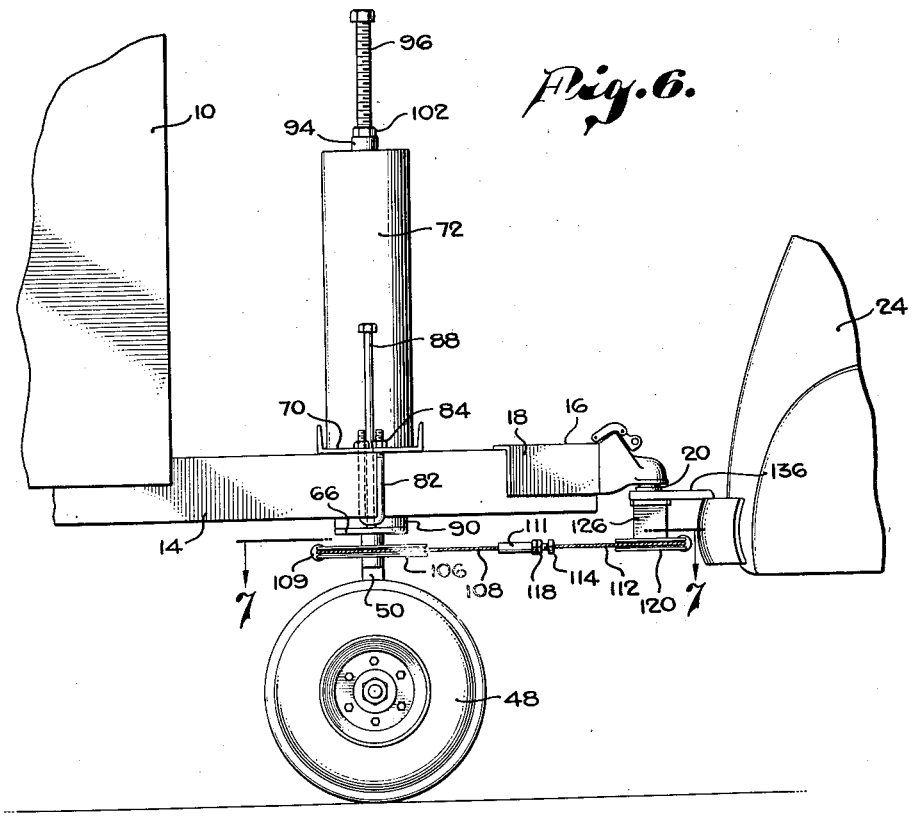
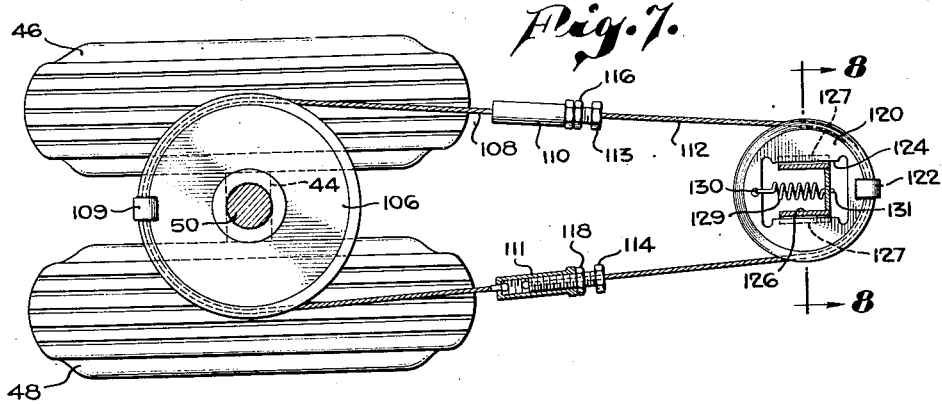
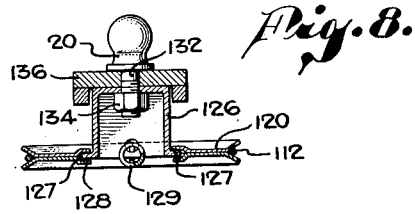
INVENTOR.
Franklin L. Winchester
BY
ATTORNEY Patented Feb. 28, 1950

2,498,780

UNITED STATES PATENT OFFICE 2,498,780

SHOCK ABSORBING TRAILER MOUNT

Franklin L. Winchester, South Gate, Calif.

Application August 18, 1947, Serial No. 769,300

14 Claims. (Cl. 280—33.5)

This invention relates to a novel and highly effective shock absorbing mounting, particularly adapted to be incorporated in a trailer, a dolly, or other wheeled unit designed to be attached to a towing vehicle.

A particular advantage of such assembly is to be obtained by association therewith of the herein described, guidable wheel mounting.

An important object is to provide a combined pneumatic and spring-loaded cushioning structure, provided with adjustable tensioning means and vertical guide means, which structure is associated with a horizontal swivel mounting.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 3 is a front elevational view thereof, partly in section, as seen along the line 3—3 of Figure 2;

Figure 4 is a top plan view of the dual wheel assembly taken along the line 4—4 of Figure 3; and Figure 5 is a transverse sectional view through the shock absorbing unit, taken along the line 5—5 of Figure 3.

Figure 6 is a side elevational view of an alternate construction, similar to Figure 2.

Figure 7 is a top plan view of the alternate construction of Figure 6 taken along the line 7—7 of Figure 6.

Figure 8 is an elevational section of the cable gripping means as seen on line 8—8 of Figure 7.

Figure 1:
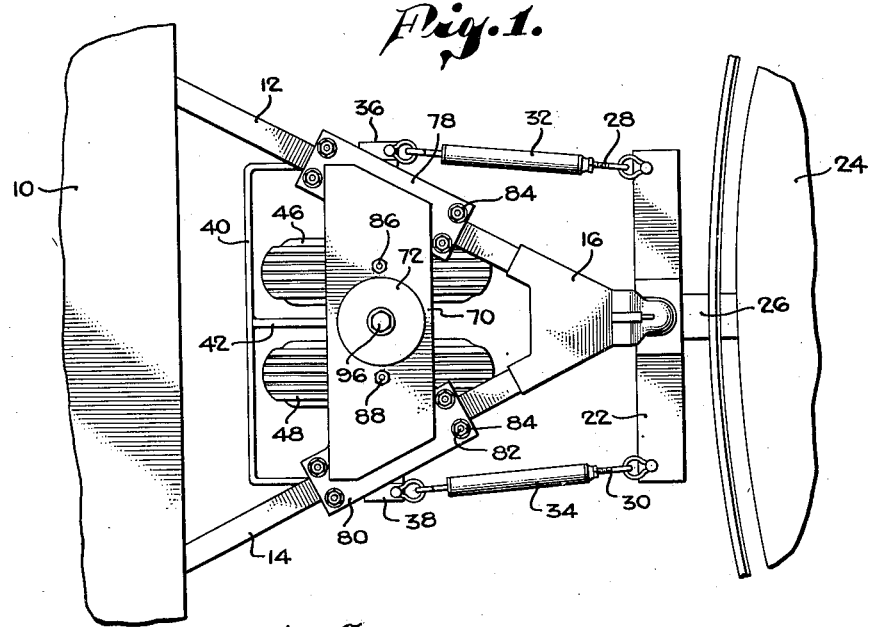
Figure 1 is a top plan view of my shock absorbing trailer coupling.
Figure 2:
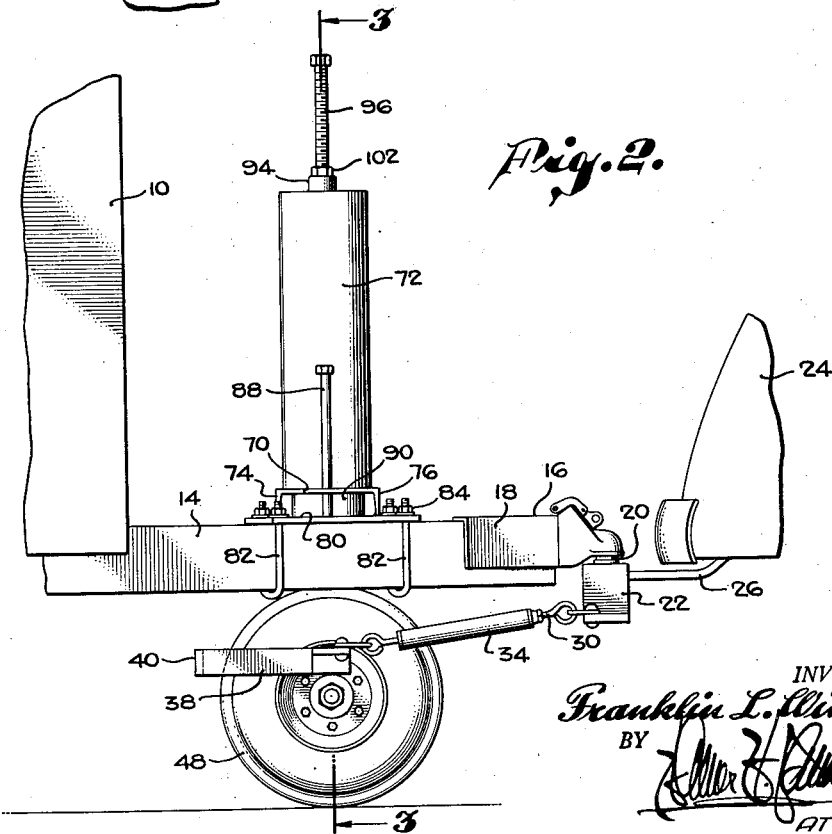
Figure 2 is a side elevational view thereof.

As illustrated, a trailer body 10 is provided with a pair of forwardly converging, inwardly facing, channel-shaped arms 12 and 14, joined together by a Y-shaped, horizontal bracket 16 mounted thereon, the converging arms of the Y each having a pair of downwardly extending side walls 18 between which the respective trailer arm 12 or 14 is received. The forward nose of the bracket is provided with a ball socket and internal engaging means adapted to retain the head of a "universal" type coupling inserted therein, the dependent vertical shank 20 of the ball joint being rotatably mounted in a housing 21 medially located along a transverse steering bar 22.

The steering bar 22 is horizontally swingable about the axis of the ball shank 20, being detachably connected at its center to the lead vehicle 24 by a rigid extension arm 26 projecting therefrom, and having its opposite ends pivotally linked to rearwardly diverging, spring-loaded, tie rods 28 and 30 disposed so as to be reciprocally extensible and retractable within tubular casings 32 and 34, in response to turning of the steering bar as particularly described and claimed in my pending application, for improvements in a Self-guiding trailer dolly, Serial No. 733,137, filed March 7, 1947.

The rear ends of the casings 32 and 34 are linked to the front ends of opposite arms 36 and 38 of a horizontally mounted, forwardly opening, somewhat U-shaped yoke or brace 40, having a medial, forwardly projecting tongue 42 between and parallel to the side arms 36 and 38. At the outer extremity of the tongue is carried a short transverse axle housing 44, on each end of which is rotatably mounted a wheel 46 and 48, the two adjacent wheels being aligned substantially parallel to each other. Extending upward from the center of the axle housing 44 is a shaft 50 supporting on its upper end a swivel or "fifth wheel" construction consisting of oppositely beveled bearing surfaces 52 and 54 axially spaced apart on the shaft and disposed on alternate sides of complementary faced, inwardly projecting annular bearings 56.

A pair of upper and lower, apertured discs or grease seals 58 and 60 complete the bearing housing, the lower disc or grease seal fitting close against the side of the shoulder 62 of the shaft 50 which is inserted through both discs or grease seals and carries a threaded nut 64 on its end; the nut abutting against the spacer ring that passes through the upper disc 60 and abuts against the upper end of the bearing 52. The whole cylindrical bearing housing is fixedly secured in a horizontal plate 66 and projects upwardly therethrough to form a partial core for a helical spring 68 disposed thereabout for a purpose shortly evident. Accordingly, this construction will be seen to permit only rotational or swivel movement of the wheels and guide yoke 40 in response to turning of the steering bar 22 as transmitted by the tie rods 28 and 30.

Upon the opposite lead arms 12 and 14 somewhat to the rear of Y-bracket 16 is rigidly mounted a superstructure composed of a supporting cross plate 70 and a centrally located, upwardly extending, cylindrical housing 72. The front and back edges of the cross plate are turned down to form vertical feet 74 and 76 which are welded or otherwise attached to longitudinally extending, horizontal members 78 and 80 mounted along the opposite lead arms by arm-cradling, curved bolts 82, carrying a threaded nut 84 on each upper end.

Transversely aligned with the axis of the upright housing 72 are a pair of upstanding guide rods 86 and 88 disposed on opposite sides of the housing, freely slidable longitudinally in corresponding openings in the cross plate 70 and having their lower ends fixedly set in the bearing support plate 66, which latter is vertically spaced some distance below the cross plate. Also mounted on the bearing support 66 is an upwardly extending, open topped tube 90 having the outer surface of the upper portion of its cylindrical wall disposed in sliding registration with the similarly shaped inner wall of the housing 72.

The housing 72 is provided with a cap or top 92 formed integral therewith and having a central, outwardly projecting boss 94 vertically tapped to receive a threaded bolt 96 therethrough. The lower extremity of the bolt carries a blunt nose 98 freely rotatable in a corresponding central recess in the upper face of a thick, annular disc 100, the lower face of which disc is formed with a peripheral groove thereabout to provide a seat for the top of the coil spring 68. It will be seen that the tension of the helix 68 can be adjusted by longitudinal movement of the threaded bolt 96, the latter being additionally provided with a lock nut 102 mounted thereon so as to abut against the top face of the housing boss 94. Such adjustment may be made from time to time, for example, to compensate for change of weight of the trailer load.

The function of the vertically slidable tube 90 and guide rods 86 and 88 in association with the helical spring 68 is to provide a shock absorbing mounting between the wheels 46 and 48 and the trailer body as represented by the lead arms 12 and 14. However, the action of the spring is augmented and equalized by the cushioning or "dash-pot" effect obtained by the telescoping or sliding tube 90 within the cylindrical housing 72 since the only escape for air or any other fluid contained within the two oppositely facing tubes is between their loosely fitting walls and through a comparatively small hole 104 drilled through the support plate 66 and opening within the inner tube 90 at the side of the bearing housing 56. This hole is purposely made small so as to allow the escape of only a small stream of air or other fluid from the telescoping cylinders so that upon appreciable upward movement of the lower tube, its air is compressed to offer increasingly greater resistance to such movement.

Although particular reference is made to pneumatic or air operation of the tubes, it will be apparent that other fluids may be used as well. In addition, much greater stability is afforded the shock absorbing assembly by the present guided mounting of the wheels through the opposite tie rods 28 and 30 and steering bar 22 than is obtainable, for example, by one or more freely swingable or castor-type wheels; and such mounting is particularly effective with my shock absorbing structure in that the two complement each other to give a balanced unit.

This construction carries the load directly under the spring. If the rear wheels of the towing vehicle should skid the dolly wheels would skid also.

Thus none of the side traction is lost because of the forward trailer weight being carried on the dolly.

In the alternative construction shown in Figures 6, 7, and 8 wheels 46 and 48 are turned and steered by the mechanism shown in plan view in Figure 7.

This mechanism consists of a horizontally mounted wheel 106 which is integrally connected to the shaft 50, so that rotation of wheel 106 effects turning of wheels 46 and 48.

A cable 108 is mounted around approximately half of the perimeter of wheel 106 and is anchored to wheel 106 at 109 so that movement of cable 108 effects rotation of wheel 106.

The ends of cable 108 are suitably mounted in housings 110 and 111.

A similar cable 112 has its ends mounted in connections 113 and 114, which, in turn are threaded through nuts 116 and 118 into the interior of housings 110 and 111, thereby effecting adjustable connection between the ends of cables 108 and 112; whereby the combined length of cables 108 and 112 may be lengthened and shortened.

Cable 112 in turn is mounted around approximately half of the perimeter of wheel 120 and is secured at 122 similarly to the way that cable 108 is secured at 109 to wheel 106. In this way rotation of wheel 120 effects a pull on cable 112, and hence, through the connection described, a pull on cable 108 and a rotation of wheel 106 in the same direction that wheel 120 is rotated.

A slot 124 in wheel 120 receives connection 126, which has flanges 127, which ride in guide 128 of slot 124 and permits connection 126 to slide toward and away from the towed vehicle against the action of spring 129, which is seated at 130 and 131 between wheel 120 and connection 126. This keeps the cables 108 and 112 taut and takes up slack caused by normal riding conditions.

A bolt 132 attached to ball 20 and nut 134 connect the connector 126 and connection 136, which is attached to the towing vehicle. The towed vehicle is connected to ball 20 and in this way turning of the towing vehicle actuates connection 136, which rotates wheel 120 through its connecting parts 132, 134, 126, 127, and 128, described above. Rotation of wheel 120 in this manner effects rotation of wheel 106 and thereby turns wheels 46 and 48 thus causing the towed vehicle to follow the towing vehicle.

While I have shown and described in some detail a presently preferred embodiment of my shock absorbing trailer mount it is to be understood that various modifications may be made in the construction and operation thereof within the scope of the subsequently claimed invention.

I claim:

1. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights and a pair of upstanding guide rods located on opposite sides of said hollow uprights, secured to one of said supports and longitudinally reciprocable through corresponding openings in the other of said supports as said uprights are telescoped.

2. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a coil spring disposed within said hollow uprights so as to urge them in opposite directions and a pair of upstanding guide rods located on opposite sides of said hollow uprights, secured to one of said supports and longitudinally reciprocable through corresponding openings in the other of said supports as said uprights are telescoped.

3. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, an upright shaft swivelly connected to the lower of said horizontal supports and at least one wheel rotatably mounted on the lower end of said shaft.

4. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions and a threaded bolt inserted through a tapped end of one hollow upright with its inner end abutting against said coil spring whereby the tension of the latter may be regulated by longitudinal movement of the bolt.

5. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, a threaded bolt inserted through a tapped end of one hollow upright with its inner end abutting against said coil spring whereby the tension of the latter may be regulated by longitudinal movement of the bolt, an upright shaft swivelly connected to the lower of said horizontal supports and at least one wheel rotatably mounted on the lower end of said shaft.

6. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, a threaded bolt inserted through a tapped end of one hollow upright with its inner end abutting against said coil spring whereby the tension of the latter may be regulated by longitudinal movement of the bolt, an upright shaft swivelly connected to the lower of said horizontal supports, and extending upward into the adjacent hollow member so as to form a core for said coil spring and at least one wheel rotatably mounted on the lower end of said shaft.

7. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, a threaded bolt inserted through a tapped end of one hollow upright with its inner end abutting against said coil spring whereby the tension of the latter may be regulated by longitudinal movement of the bolt, an upright shaft swivelly connected to the lower of said horizontal supports, at least one wheel rotatably mounted on the lower end of said shaft, connecting structures adapted to attach said shaft and wheel to a towing vehicle, said structures comprising a forwardly opening U-shaped yoke disposed about said wheel and shaft and rigidly secured to the latter, a horizontally swingable steering bar, a pair of spring-loaded tie rods connecting the ends of the steering bar with the respective adjacent arms of the U-yoke, and coupling means adapted to connect said wheeled structure and steering bar to a lead vehicle.

8. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, a threaded bolt inserted through a tapped end of one hollow upright with its inner end abutting against said coil spring whereby the tension of the latter may be regulated by longitudinal movement of the bolt, an upright shaft swivelly connected to the lower of said horizontal supports, and extending upward into the adjacent hollow member so as to form a core for said coil spring, at least one wheel rotatably mounted on the lower end of said shaft, connecting structures adapted to attach said shaft and wheel to a towing vehicle, said structures comprising a forwardly opening U-shaped yoke disposed about said wheel and shaft and rigidly secured to the latter, a horizontally swingable steering bar, a pair of spring-loaded tie rods connecting the ends of the steering bar with the respective adjacent arms of the U-yoke, and coupling means adapted to connect said wheeled structure and steering bar to a lead vehicle.

9. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, an upright shaft swivelly connected to the lower of said horizontal supports, at least one wheel rotatably mounted on the lower end of said shaft, connecting structures adapted to attach said shaft and wheel to a towing vehicle, said structures comprising a forwardly opening U-shaped yoke disposed about said wheel and shaft and rigidly secured to the latter, a horizontally swingable steering bar, a pair of spring-loaded tie rods connecting the ends of the steering bar with the respective adjacent arms of the U-yoke, and coupling means adapted to connect said wheeled structure and steering bar to a lead vehicle.

10. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, an upright shaft swivelly connected to the lower of said horizontal supports and at least one wheel rotatably mounted on the lower end of said shaft.

11. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, an upright shaft swivelly connected to the lower of said horizontal supports, at least one wheel rotatably mounted on the lower end of said shaft, connecting structures adapted to attach said shaft and wheel to a towing vehicle, said structures comprising a forwardly opening U-shaped yoke disposed about said wheel and shaft and rigidly secured to the latter, a horizontally swingable steering bar, a pair of spring-loaded tie rods connecting the ends of the steering bar with the respective adjacent arms of the U-yoke; and coupling means adapted to connect said wheeled structure and steering bar to a lead vehicle.

12. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, an upright shaft swivelly connected to the lower of said horizontal supports and extending upward into the adjacent hollow member so as to form a core for said coil spring, at least one wheel rotatably mounted on the lower end of said shaft, connecting structures adapted to attach said shaft and wheel to a towing vehicle, said structures comprising a forwardly opening U-shaped yoke disposed about said wheel and shaft and rigidly secured to the latter, a horizontally swingable steering bar, a pair of spring-loaded tie rods connecting the ends of the steering bar with the respective adjacent arms of the U-yoke; and coupling means adapted to connect said wheeled structure and steering bar to a lead vehicle.

13. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said member being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, an upright shaft swivelly connected to the lower of said horizontal supports, at least one wheel rotatably mounted on the lower end of said shaft and connecting structures adapted to attach said shaft and wheel to a towing vehicle, said structures comprising a wheel rigidly secured to said shaft, another wheel rigidly secured to said towing vehicle and a cable connecting said wheels whereby rotation of said wheel secured to said towing vehicle effects rotation of said wheel secured to said shaft.

14. A wheeled structure of the character described including: a pair of substantially horizontally disposed supports vertically spaced apart and connected respectively to a wheel and to the structure body, a pair of loosely telescopically mounted, upright, hollow members each having one closed end and one open end, the interior of said members being in communication through said open ends, one of said closed ends being drilled to permit the restricted passage of fluid therethrough, each of said horizontal supports being fixedly attached to a different one of said hollow uprights, a pair of upstanding guide rods located on opposite sides of said hollow uprights, secured to one of said supports and longitudinally reciprocable through corresponding openings in the other of said supports as said uprights are telescoped, a coil spring disposed within said hollow uprights so as to urge them in opposite directions, an upright shaft swivelly connected to the lower of said horizontal supports, at least one wheel rotatably mounted on the lower end of said shaft and connecting structures adapted to attach said shaft and wheel to a towing vehicle, said structures comprising a wheel rigidly secured to said shaft, another wheel rigidly secured to said towing vehicle and a cable connecting said wheels whereby rotation of said wheel secured to said towing vehicle effects rotation of said wheel secured to said shaft.

FRANKLIN L. WINCHESTER.

REFERENCES CITED

The following references are of record in the file of this patent:

UNITED STATES PATENTS

| Number | Name | Date |
|---|---|---|
| 1,555,171 | Ulevog | Sept. 29, 1925 |
| 1,568,417 | Rhenbottom | Jan. 5, 1926 |
| 2,105,246 | Horsfield | Jan. 11, 1938 |
| 2,347,524 | Swan | Apr. 25, 1944 |
| 2,420,906 | Burt | Nov. 18, 1947 |